(12) United States Patent
Sokolov et al.

(10) Patent No.: US 9,976,488 B2
(45) Date of Patent: May 22, 2018

(54) METHOD OF OPERATING A GAS TURBINE ENGINE BURNING VANADIUM-CONTAMINATED LIQUID FUEL

(71) Applicant: GE ENERGY PRODUCTS FRANCE SNC, Belfort (FR)

(72) Inventors: Dmitry Sokolov, Buc (FR); Matthieu Paul Frederic Vierling, Dampierre-les-Bois (FR); Christophe Fabrice Verdy, Evette-Salbert (FR); Michel Marie Raymond Moliere, Belfort (FR)

(73) Assignee: GE Energy Products France SNC, Belfort (FR)

( * ) Notice: Subject to any disclaimer, the term of this patent is extended or adjusted under 35 U.S.C. 154(b) by 491 days.

(21) Appl. No.: 14/691,053

(22) Filed: Apr. 20, 2015

(65) Prior Publication Data

US 2015/0300263 A1    Oct. 22, 2015

(30) Foreign Application Priority Data

Apr. 22, 2014    (FR) ...................................... 14 53596

(51) Int. Cl.
*F02C 3/20* (2006.01)
*F02C 7/30* (2006.01)
(Continued)

(52) U.S. Cl.
CPC ............... *F02C 7/30* (2013.01); *C10L 10/04* (2013.01); *F01D 25/002* (2013.01); *F02C 3/24* (2013.01);
(Continued)

(58) Field of Classification Search
CPC ...... F01D 25/002; F02C 7/30; F05D 2260/95; F23R 2900/00004
See application file for complete search history.

(56) References Cited

U.S. PATENT DOCUMENTS 2,059,396 A * 11/1936 Ripert ...................... A61K 8/25
                                              424/49
3,738,819 A    6/1973 Milner et al.
(Continued)

FOREIGN PATENT DOCUMENTS

CH    307980        6/1955
CH    660056 A5 *   3/1987    ................ F02C 7/00
(Continued)

*Primary Examiner* — Lorne Meade
(74) *Attorney, Agent, or Firm* — Armstrong Teasdale LLP (57) ABSTRACT

A method of operating of a gas turbine engine to inhibit vanadic corrosion of the gas turbine engine is provided. The gas turbine engine burns a vanadium-contaminated fuel and includes a component configured to be in contact with combustion gases. The method includes introducing into a combustion system of the gas turbine engine a first oxide and at least one second oxide. The first oxide includes magnesium oxide, and the at least one second oxide includes at least one of aluminum oxide, iron (III) oxide, titanium dioxide, and silicon dioxide. The method further includes cleaning at least a portion of the component using a cleaning agent containing a liquid vector and at least one descaling material that is suspended in the liquid vector. The at least one descaling material is an inorganic material.

19 Claims, 2 Drawing Sheets

(51) Int. Cl.
*C10L 10/04* (2006.01)
*F01D 25/00* (2006.01)
*F02C 3/24* (2006.01)
*F23J 7/00* (2006.01)

(52) U.S. Cl.
CPC ........... *F23J 7/00* (2013.01); *C10L 2200/024* (2013.01); *C10L 2200/0213* (2013.01); *C10L 2200/0218* (2013.01); *C10L 2200/0222* (2013.01); *C10L 2200/0268* (2013.01); *C10L 2200/0272* (2013.01); *C10L 2200/0438* (2013.01); *C10L 2250/00* (2013.01); *C10L 2270/04* (2013.01); *C10L 2290/141* (2013.01); *C10L 2290/58* (2013.01); *C10L 2290/60* (2013.01); *F05D 2220/32* (2013.01); *F05D 2260/95* (2013.01); *F23R 2900/00004* (2013.01)

(56) References Cited

U.S. PATENT DOCUMENTS

| | | | |
|---|---|---|---|
| 3,994,699 A | 11/1976 | Scott | |
| 4,047,875 A | 9/1977 | May et al. | |
| 4,181,633 A * | 1/1980 | Colodney | C09G 1/02 106/3 |
| 4,840,746 A * | 6/1989 | Shiozaki | C11D 1/83 134/42 |
| 5,120,695 A | 6/1992 | Blumrich et al. | |
| 6,310,022 B1 * | 10/2001 | Amiran | C11D 1/72 134/2 |
| 7,574,856 B2 * | 8/2009 | Mak | F01K 23/10 60/39.182 |
| 8,282,693 B2 | 10/2012 | Moliere et al. | |
| 9,556,393 B2 * | 1/2017 | Moliere | C10L 10/04 |
| 2011/0056209 A1 | 3/2011 | Moliere et al. | |
| 2011/0217568 A1 | 9/2011 | Pareek et al. | |
| 2012/0171936 A1 * | 7/2012 | Haerle | B24B 37/044 451/59 |
| 2013/0213282 A1 | 8/2013 | Meskers, Jr. et al. | |
| 2015/0083165 A1 * | 3/2015 | Moliere | F01D 25/002 134/22.14 |

FOREIGN PATENT DOCUMENTS

| | | |
|---|---|---|
| EP | 2236585 A1 | 10/2010 |
| GB | 697101 | 9/1953 |
| GB | 762521 | 11/1956 |
| GB | 764752 | 1/1957 |
| WO | 9951707 A1 | 10/1999 |

* cited by examiner

METHOD OF OPERATING A GAS TURBINE ENGINE BURNING VANADIUM-CONTAMINATED LIQUID FUEL

CROSS-REFERENCE TO RELATED APPLICATION

This application claims priority to French patent application Serial No. 14 53596, entitled "PROCEDE D'EXPLOITATION D'UNE TURBINE A GAZ IMPLIQUANT LA COMBUSTION D'UN COMBUSTIBLE LIQUIDE CONTAMINE AU VANADIUM" filed Apr. 22, 2014, the disclosure of which is incorporated herein by reference in its entirety.

BACKGROUND

The subject of the present disclosure is a method of operation of a gas turbine burning vanadium-contaminated liquid fuel.

The "hot parts" of a gas turbine are components of a gas turbine that are in contact with the combustion gases. In the current models, these combustion gases have speeds of several hundreds of meters per second and temperatures in excess of about 1000° C. The hot parts, are made of superalloys (in general nickel-based) and can be coated with ceramic coatings (anti-corrosion coatings; thermal barriers). Additionally, the hot parts include components of the combustion system (combustion liners; transition pieces etc.) and, downstream in the direction of the flow of the combustion gases, the stationary ("turbine nozzles") and moving ("buckets") components of the expansion turbine. These hot parts employ highly elaborate materials and manufacturing processes and are therefore very costly. The "firing temperature" ("T") is the temperature of the combustion gases entering the expansion turbine. The higher the T, the higher the energy conversion performance of the gas turbine in terms of mechanical or electrical efficiency and power output.

Among the different chemical phases that constitute the ashes of the combustion process, the vanadium pentoxide ($V_2O_5$) produced by the oxidation of vanadium in the flames, has a very low melting point (of about 675° C.). The vanadium pentoxide therefore travels as a molten phase in the combustion gases and is capable of causing very intense corrosion at high temperatures of the hot parts, known as vanadic corrosion.

BRIEF DESCRIPTION

In one aspect, a method of operating of a gas turbine engine to inhibit vanadic corrosion of the gas turbine engine is provided. The gas turbine engine burns a vanadium-contaminated fuel and includes a component configured to be in contact with combustion gases. The method includes introducing into a combustion system of the gas turbine engine a first oxide and at least one second oxide. The first oxide includes magnesium oxide, and the at least one second oxide includes at least one of aluminum oxide, iron (III) oxide, titanium dioxide, and silicon dioxide. The method further includes cleaning at least a portion of the component using a cleaning agent containing a liquid vector and at least one descaling material that is suspended in the liquid vector. The at least one descaling material is an inorganic material.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The present disclosure relates to the use of "heavy fuel oils" ("HFO") as gas turbine ("GT") fuels.

In this disclosure, the term "HFO" denotes any fuel containing vanadium and other contaminants, including sulfur. The combustion of HFO consequently generates ash material. The hot parts of the gas turbine are those components that are in contact with the combustion gas circulating at high speed and high temperature, including the components of the combustion system and the expansion turbine (turbine nozzles and buckets).

This corrosion is controlled by adding a vanadium inhibitor, which is generally a magnesium-based substance, to the HFO. The magnesium oxide (MgO) that is formed in the flames reacts with $V_2O_5$ to form magnesium vanadates and mainly orthovanadate ($Mg_3V_2O_8$), which is a refractory and non-corrosive phase. The magnesium vanadates are associated with the magnesium sulfate ($MgSO_4$) that is formed from the magnesium of the inhibitor and the sulfur from the HFO on the one hand and with the magnesium oxide coming from the partial desulfation of magnesium sulfate at a high temperature on the other hand. The magnesium vanadates contribute to increasing the ash content of the combustion gases passing through the expansion turbine.

In addition to the risk of vanadic corrosion, the ash has two other deleterious effects on the hot parts, including fouling and erosion. The partial deposit of ash on the walls of the hot parts contributes to the progressive fouling of the hot parts over hours of operation and further contributes to and correlates with a rapid degradation of the energy conversion performance of the gas turbine. The fouling can be controlled by periodic cleaning operations according to two methods. The first cleaning method consists of dry cleaning operations which are performed on-line. As used herein, the term "on-line" means without stopping the gas turbine. The first cleaning method involves the injection of a descaling agent capable of releasing at least some of the ash deposited on the hot parts. In the conventional dry cleaning method, ligneous materials are used as descaling agents (i.e. fragments of wood or plant shells). However, these dry cleaning operations, regardless of their effectiveness, do not obviate the need for a water wash of the gas turbine to be carried out after a certain number of operating hours. The water wash constitutes the second cleaning method and is performed while the gas turbine is off line. As used herein, the term "off line" means when the gas turbine is not in use. The water wash requires the gas turbine to be shut down and cooled, and as such reduces the availability of the gas turbine. The water wash consists of injecting pure hot water onto the hot parts of the gas turbine so as to extract the soluble fraction (magnesium sulfate) from the ash deposits, causing the latter to disintegrate and allowing virtually all of the deposits to be carried away in the wash water stream. The water wash operation is highly effective and leaves a gas turbine virtually free of ash deposits. It is generally carried out in response to the power output of the gas turbine falling below a predetermined threshold expressed as percentage "X" of the "initial power output" which is the power output of the clean machine (X being comprised, for example, between about 90% and 95%).

In relation to the erosion, the walls of the hot parts are subjected to the impact of high speed ash particles and therefore subject to accelerated erosion which, after a certain number of operating hours, requires their repair and, ultimately, their replacement with new parts.

Aspects of this disclosure relate to optimizing the operation of a HFO-fired gas turbine both in terms of energy and lifetime of hot parts in order to, in part, reduce the cost of the kilowatt hours produced throughout the life of the gas turbine.

In some aspects, the optimization of the energy performance is achieved, in part, by combining a vanadic corrosion inhibition method capable of reducing fouling of the hot parts resulting from the ash deposits. Additionally, the optimization of the energy performance is achieved, in part, through the effective method of the removal of these deposits. In addition to this optimization of the energy performance, it is possible to extend the lifetime of the hot parts by associating both methods with a family of protection coatings for hot parts allowing their erosion to be minimized.

Thus, aspects of this disclosure relate to a method of operation of a gas turbine burning a vanadium-contaminated liquid fuel in a combustion system of a gas turbine fitted with a gas expansion turbine, the combustion leading to the formation of vanadium pentoxide $V_2O_5$, the method being intended to inhibit the vanadic corrosion of a hot part of the gas turbine.

In some aspects, a method of operating a gas turbine to inhibit vanadic corrosion includes: a step of introducing into the combustion system a first oxide which is magnesium oxide and at least one second oxide selected from aluminum oxide ($Al_2O_3$), iron (III) oxide ($Fe_2O_3$), titanium dioxide ($TiO_2$), and silicon dioxide ($SiO_2$). In some aspects, the ratio "m" of the number of moles of MgO to the number of moles of $V_2O_5$ and the ratio "a" of the total number of mole of second oxide(s) to the number of moles of $V_2O_5$ satisfy the two conditions: (i) a+3<m<15, and (ii) $[1/(1+K)](m-2) \leq a \leq [10/(10+K)](m-2)$, where "K" is defined by the relation: $K=MV*HK*e^{(-0.0056*T)}$, T is the firing temperature of the gas turbine, in Kelvin, and MV and HK designate, respectively, the average density defined at ambient temperature (i.e. between about 15° C. and 25° C.), and the average Knoop hardness, defined by American Society for Testing and Materials (ASTM) standard E384 and measured at ambient temperature, of the double oxides formed by the reaction between the magnesium oxide and the second oxide(s). This inhibition method will at times be referred to as the "bimetallic inhibition method."

Additionally, the method of operating a gas turbine to inhibit vanadic corrosion also includes, in some aspects, at least one step of cleaning the hot part using a cleaning agent containing a liquid vector and at least one descaling material that is suspended in the liquid vector. The descaling material is selected from the oxides. In other aspects, the descaling material is selected from combinations of oxides. In some aspects, the descaling material is anhydrous. In other aspects the descaling material is hydrated. In additional aspects, the descaling material is derived from oxides, or combinations of oxides, of the following elements: magnesium, calcium, titanium, iron, aluminum, and/or silicon in the form of non-fibrous structure silicates, and phosphorus in the form of alkaline-earth phosphates. In some aspects, the Mohs hardness of the descaling material is less than or equal to about 7, and the product of the density of the descaling material by the Mohs hardness of the descaling material is between about 12 and 35. In some aspects, the average size of the particles varies between about 5 and 315 micrometers.

The term "T" designates the firing temperature of the gas turbine considered. In some aspects, "T" includes any definition of temperature which will satisfactorily reflect the conditions of exposure to vanadic corrosion of hot parts of the gas turbine. For example, in some aspects, "T" is the temperature of the combustion gas at the outlet of the combustion system. In additional aspects, "T" is the temperature of a particular hot part. In some aspects, "T" is one of: (i) the temperature of the combustion liners or the transition pieces, (ii) the temperature of the first stage nozzles, (iii) the temperature of the first stage buckets, (iv) the average between the temperature of the combustion gas and each of these three temperatures, and (v) one of these four temperatures increased by a safety margin (in the context of a deliberately conservative approach). Each of these temperatures (i-iv) can be understood to mean a surface temperature (or "skin temperature") or an average temperature through a depth or on a surface of the hot part, etc.

The various T designations and temperatures refer to the "degrees of safety" in anti-corrosion protection. In some aspects, higher T values lead to higher values of the parameter "a" and therefore to an increasing cost. Identifying the parameter T as the firing temperature, in part, helps to ensure a good compromise between the safety of the anti-corrosion protection and the cost of implementation of the inhibition.

In some aspects, the firing temperature of the gas turbine is greater than or equal to 1363 K.

In some aspects, several cleaning steps are carried out during an operating cycle of the gas turbine.

In some aspects, the hot part is coated with an erosion resistant coating containing chromium carbide, alumina and/or titanium oxide.

In some aspects, ratios m and a satisfy the relation: $m \geq a+3.5$. In additional aspects, parameters m and a satisfy the relation: $[2/(2+K)](m-2) \leq a \leq [5/(5+K)](m-2)$. In some preferable modes of execution, m is approximately 9 and a is approximately 4.5.

In some aspects, the second oxide used is $Al_2O_3$. In consideration of the corresponding values of parameters MV, HK and T described herein, the ratios m and a of the double oxide $MgAl_2O_4$, satisfy the relation: $0.343 (m-2) \leq a \leq 0.839 (m-2)$.

In some aspects, the second oxide used is $Fe_2O_3$. In consideration of the corresponding values of parameters MV, HK and T described herein, the ratios m and a of the double oxide $MgFe_2O_4$ satisfy the relation: $0.408 (m-2) \leq a \leq 0.874 (m-2)$.

In some aspects, the second oxide used is $TiO_2$. In consideration of the corresponding values of parameters MV, HK and T described herein, the ratios m and a of the double oxide $MgTiO_3$ satisfy the relation: 0.563 (m−2) ≤a≤0.928 (m−2).

In further aspects, the second oxide used is $SiO_2$. In consideration of the corresponding values of parameters MV, HK and T described herein, the ratios of m and a of the double oxide $MgSiO_3$ satisfy the relation: 0.617 (m−2) ≤a≤0.942 (m−2).

In some aspects, the descaling material is chosen from the following inorganic materials: hematite, maghemite, goethite, lepidocrocite, magnetite, wustite, rutile, anatase, brookite, geikielite, perovskite, ilmenite, wollastoite, larnite, enstatite, akermanite, diopside, merwinite, monticellite, fosterite, fayalite, andradite, andalousite, cyanite, sillimanite, mullite, anorthite, ghelenite, hydroxyapatite, and their mixtures.

In some aspects, the liquid vector, hydrophilic, comprises at least one of one alcohol, one polyol, one polyethyleneglycol, and one polyether.

In some aspects, the liquid vector comprises at least one non-anionic dispersing additive. In further aspects, the non-anionic dispersing additive is organic.

In some aspects, the liquid vector comprises at least one antifoaming additive. In further aspects, the antifoaming additive is non-silicon. In certain aspects, the antifoaming additive is organic.

In some aspects, the liquid vector comprises at least one biocide additive. In further aspects, the biocide additive is organic.

In some aspects, the liquid vector comprises at least one antifreeze additive. In further aspects, the antifreeze additive is organic.

Figure 1:
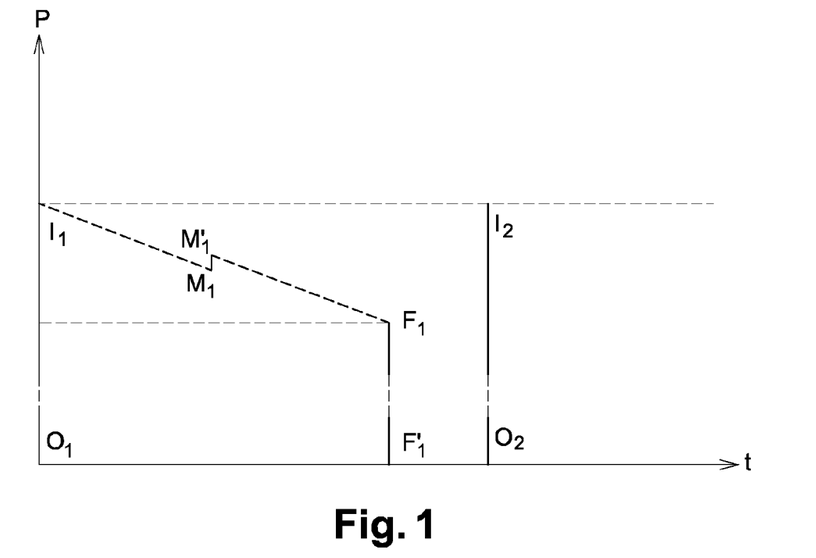
FIG. 1 relates to an exemplary embodiment of a first operating method.
Figure 2:
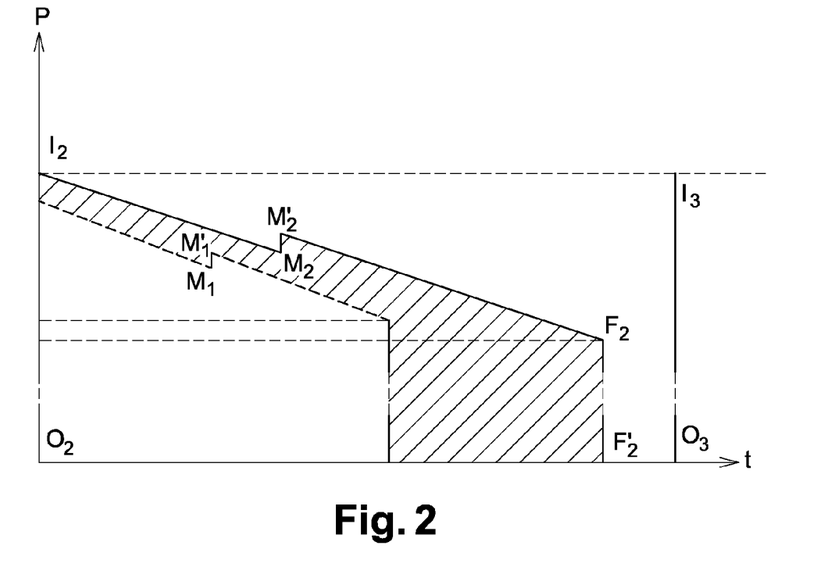
FIG. 2 relates to an exemplary embodiment of a second operating method.

Other characteristics and advantages of the present disclosure will appear more clearly on reading the following description provided as an illustrative and non-restrictive example and referring to FIGS. 1 and 2 attached which present two graphs to facilitate the understanding of the method according to the invention.

Figure 3:
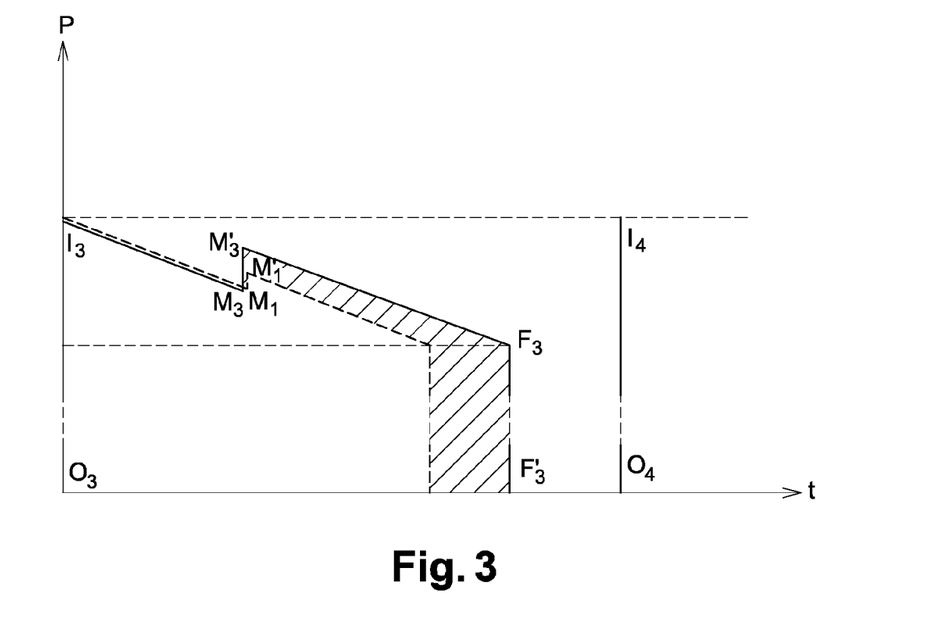
FIG. 3 relates to an exemplary embodiment of a third operating method.

FIGS. 1-3 relate to the same gas turbine burning the same HFO and operating under the same conditions, e.g. at full load. FIGS. 1-3 schematically represent aspects of the bimetallic inhibition method and the cleaning methods. The Figures plot, in a schematic form, the evolution of the power output "P" of the gas turbine as a function of time "t" and throughout a "cycle" which is the duration that elapses between two consecutive water washes. In some aspects, the evolution of the power output can be replaced with that of the efficiency of the gas turbine, which is similar.

FIG. 1 relates to "operating method I" which is also known as a "baseline operating method." Operating method I includes an inhibition according to a conventional method based on a magnesium inhibitor with m=12.6 and a=0. During the cycle, in operating method I, at least one dry cleaning operation is carried out according to a conventional method where the descaling agent is composed of, for example, wood particles. A water wash is carried out when the power output falls below about 90% of the initial power output.

FIG. 2 relates to "operating method II." Operating method II includes an inhibition according to the bimetallic inhibition method based on magnesium and, for example, aluminum with, for example: m=9 and a=4.5. During the cycle, in operating method II, at least one dry cleaning operation is carried out according to a conventional method where the descaling agent is composed of, for example, wood particles.

FIG. 3 relates to "operating method III." Operating method III includes an inhibition according to a conventional method based on a magnesium inhibitor with m=12.6 and a=0. During the cycle, in operating method III, at least one dry cleaning operation is carried out according to the cleaning method using an inorganic descaling agent composed of, for example, wollastonite particles suspended in water.

Referring back to FIG. 1 relating to the "baseline operating method," the ordinate at the origin OW represents the "initial power output" of the gas turbine in the "clean" state; this initial power output is associated with the firing temperature $Tf_1$. Curve 1 plots the progressive loss of power output, which is substantially linear, correlated to the fouling of the hot parts, the slope of this curve (dP/dt)1 is negative. At point $M_1$ conventional dry cleaning is carried out where the resulting power recovery $M_1M'_1$ is extremely limited and less than 10% of the "lost" power. At point $F_1$, the gas turbine is stopped (vertical line $F_1F'_1$) because the power has fallen below the predefined threshold of 90% of the initial power output; therefore $F'_1F_1=0.9 \times O_1I_1$. The gas turbine is then cooled down and subsequently washed with water (sequence $F'_1O_2$) which finishes the operating cycle. At this point, the gas turbine is clean and can be restarted for a new operating cycle with HFO.

Referring now to FIG. 2, which relates to the "operating method II" and includes, for comparison purposes, curve 1 of operating method I drawn in dotted lines. The ordinate at the origin $O_2I_2$ represents the "initial power output" of the clean gas turbine which is greater than that $O_1I_1$ of the baseline operating method. Due, in part, to the use of the bimetallic inhibition method, operating method II allows for the choice of a firing temperature $Tf_2$ higher than $Tf_1$ which enhances the performance of the gas turbine. Curve 2 plots the progressive loss of power, which is substantially linear. The negative slope $(dP/dt)_2$ of curve 2 is, in absolute terms, lower than slope (dP/dT)1 of FIG. 1 due, in part, to the positive effect of the bimetallic inhibitor Mg—Al. At point M2, conventional dry cleaning with wood particles is carried out. The resulting power recovery $M_2M'_2$ is limited, less than 10%, and lies close to the recovery $M_1M'_1$ obtained with the baseline operating method. At point F2, the gas turbine is stopped (vertical line $F_2F'_2$), because the power has fallen below the threshold of 90% of the initial power output; therefore $F'_2F_2=0.9 \times O_2I_2$. The gas turbine is then cooled down and subsequently washed with water (sequence $F'_2O_3$) which finishes the operating cycle. At this point, the gas turbine is clean and can be restarted for a new operating cycle. The surplus of energy that is produced over an operating cycle with operating method II as compared to the baseline operating method is equal to the hatched area in FIG. 2.

Referring to FIG. 3 which relates to "operating method III" and includes, for reference purposes, curve 1 of the operating method I drawn as dotted lines, the ordinate at the origin $O_3I_3$ represents the "initial power output" of the clean gas turbine which is equal to that at OW of the baseline operating method due, in part, to the same conventional magnesium inhibitor with the same dosage being used. The firing temperature $Tf_3$ is equal to $Tf_1$. Curve 3 plots the progressive loss of power. The negative slope $(dP/dt)_3$ of curve 3 is substantially equal to slope $(dP/dT)_1$ of curve 1. At point $M_3$, dry cleaning is carried out according to the mineral descaling agent method using wollastonite suspended in water. The power recovery $M_3M'_3$ is much greater than those recorded in operating methods 1 and 2 due, in part, to the particular cleaning effect provided by the inorganic descaling agent. At point $F_3$, the gas turbine is stopped (line $F_3F'_3$) because the power has fallen below the threshold of about 90% of the initial power output; therefore $F'_3F_3=0.9\times O_3I_3$. The gas turbine is cooled down and subsequently washed with water (sequence $F'_3O_4$) which finishes this operating cycle. The gas turbine is clean and can be restarted for a new cycle. The surplus of energy that is produced over an operating cycle with operating method III as compared to the baseline operating method is equal to the hatched area in FIG. 3.

In some aspects, when combining the bimetallic inhibition method and the mineral descaling agent cleaning method for a gas turbine burning HFO, the power recovery provided by a dry cleaning operation is greater not only than that observed with operating methods I and II (segments $M_1M'_1$ and $M_2M'_2$ of FIGS. 1 and 2 respectively) which employ conventional dry cleaning operations, but also than that observed with operating method III (segment $M_3M'_3$ of FIG. 3) which also employs the inorganic descaling agent based cleaning method but in combination with the conventional inhibition method.

Figure 4:
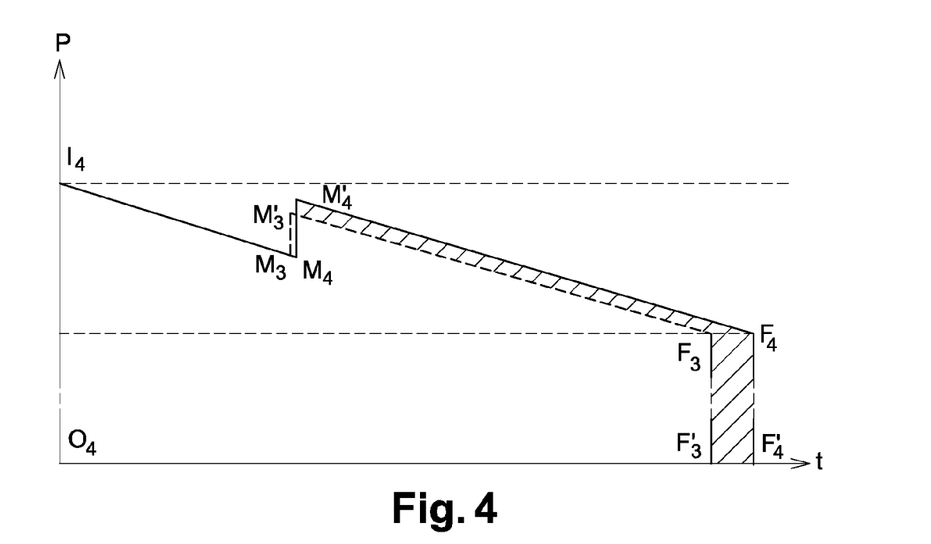
FIG. 4 relates to an exemplary embodiment of a fourth operating method.

The combination of the bimetallic inhibition method and the inorganic descaling agent cleaning method will hereinafter be designated by the expression "operating method with improved performance." FIG. 4 relates to the operating method with improved performance. Curve 4 plots the decrease of the power output. For comparison purposes, FIG. 4 also includes curve 3 of FIG. 3 of operating method 3 drawn in dotted lines. At point M4, dry cleaning is carried out according to the inorganic descaling agent cleaning method using wollastonite suspended in water. The power recovery ($M_4M'_4$) is not only greater than that recorded in operating methods I and II, which employ wood particles that are less effective than wollastonite particles, but also, remarkably, significantly greater than that recorded in operating method III (segment $M_3M'_3$ of curve 3), which employs the same wollastanite cleaning method. The vertically hatched area on FIG. 4 represents the surplus of energy that is produced over a cycle with the operating method with improved performance as compared to the quantity of energy that was initially expected from the combination of the bimetallic inhibition method and the inorganic descaling agent cleaning method.

Based on this synergy between the bimetallic inhibition and mineral agent cleaning methods, it is also possible to operate a gas turbine burning HFO by applying the bimetallic inhibition treatment and making repeated use, during each cycle, of the inorganic descaling agent cleaning. In some aspects, for the operation of gas turbines burning HFO, the operating method with improved performance can be used in which the dry cleaning operation is carried out more than once per cycle. For example, the dry cleaning operation is carried out in a substantially periodic manner with, for example, an approximately daily or twice-daily frequency. The operating method with improved performance with a dry cleaning operation carried out more than once per cycle will be designated by the expression "operating method with optimized performance."

It should be emphasized that gas turbines are thermal equipment items with an operating plan that is subject to relatively numerous and strict industrial constraints and that, as a result, the above-mentioned notion of "periodicity" for dry cleaning operations is necessarily relative. A gas turbine operating at low load over a given period, for example, will be subjected to less frequent dry cleaning operations as compared to another period where it operates at full load. Accordingly, the time that elapses between two dry cleaning operations may vary to a certain extent, knowing that these operations must be carried out according to the degree of actual fouling of the hot parts of the gas turbine which can also be monitored through the progressive degradation of the performance parameters, the power output being the easiest performance parameter to monitor. The term "substantially" in use with the explanation of the periodic cleaning operations is used to reflect the relative nature of the gas turbine cleaning. However, when the "operating method with optimized performance" is applied, the increase in dry cleaning operations may accelerate the erosion rate of the hot parts after a large number of cycles, even if the properties of the particles used in mineral descaling agent cleaning were chosen to minimize this erosion effect.

In some aspects, the "operating method with optimized performance" is combined with a hot part protection method that employs "highly corrosion resistant coatings." Among the coatings suitable for this purpose are coatings having chromium carbide, alumina, titanium oxide, or a combination of these substances. More particularly, the coatings described in U.S. Patent Publication No. 2011/0217568 can be applied. In some aspects, such highly corrosion resistant coatings are beneficial even if only one dry cleaning operation is to be carried out per operating cycle, because a benefit will still be realized in the extended lifetime of the hot parts.

The combination of highly corrosion resistant coatings with bimetallic inhibition and inorganic descaling agent cleaning methods thus defines an operating method referred to as the "optimized operating method," which ensures both (i) an improvement of the energy performance of the gas turbine, and (ii) the preservation or even extension of the lifetime of the hot parts, two aspects that directly affect the cost of the kW-h produced throughout the lifetime of the hot parts.

Thus, three main operating methods of a gas turbine burning a vanadium-contaminated fuel can be implemented, which provide better performances than: (1) those provided by the baseline operating method which is based on the conventional inhibition method and the conventional dry cleaning method, (2) those provided by the operating method based on the combination of the bimetallic inhibition method and the conventional dry cleaning method, and (3) those that may be expected from the combination of the conventional inhibition method and the inorganic descaling agent cleaning method.

The first of these operating methods, called "operating method with improved performance" because it improves the energy performance of the gas turbine, includes the following measures:

(A) The gas turbine is subjected to a vanadic corrosion inhibition method, called "bimetallic inhibition method," where the vanadium inhibitor contains magnesium and a second metal "A" chosen from the following list: aluminum (Al), iron (Fe), titanium (Ti), and silicon (Si). The parameters "m" and "a," which are respectively the ratios of the number of moles of MgO and the number of moles of oxide formed by the second metal A to the number of moles of $V_2O_5$, satisfy the inequalities:

$$a+3<m<15 \tag{Eq. 1}$$

$$[1/(1+K)](m-2)<a<[10/(10+K)](m-2) \tag{Eq. 2}$$

where the parameter "K" is defined as follows: $K=MV*HK*e^{(-0.0056*T)}$ and where T is the firing temperature of the gas turbine in degrees K, and MV and HK are respectively the density (g/cm³) and the Knoop hardness (g/mm²) of the double oxide $MgA_yO_z+_1$.

(B) During an operating cycle of the gas turbine, i.e. between two successive water wash operations, at least one dry cleaning operation according to the "descaling agent cleaning method" is carried out, in which the descaling agent, suspended in a liquid, is a mineral material whose grain size, density and Mohs hardness characteristics satisfy the following criteria: (1) the grain size of the descaling agent is "micrometric" with, for example, a size between about 5 and 315 µm, (2) the Mohs hardness of the descaling agent is less than or equal to about 7, and (3) the "efficiency factor" of the descaling agent, which is the product of the Mohs hardness of the descaling agent by the density of the descaling agent, lies between about 12 and 35.

The second of these operating methods, called the "operating method with optimized performance," helps to ensure not only the improvement but also the optimization of the energy performance of the gas turbine. In the operating method with optimized performance, the gas turbine is subjected to the bimetallic inhibition method and dry cleaning operations according to the inorganic descaling agent cleaning method are carried out per operating cycle of the gas turbine in a substantially periodic manner.

The third operating method, called the "optimized operating method," facilitates both the optimization of the energy performance and at least the preservation of the lifetime of the parts. In the optimized operating method, the hot parts are provided with highly erosion resistant coatings, in particular coatings containing chromium carbide, aluminum, titanium oxide or a combination of these substances. The gas turbine is subjected to the bimetallic inhibition method, and the dry cleaning operations according to the inorganic descaling agent cleaning method are carried out per operating cycle of the gas turbine in a substantially periodic manner. In this third operating method, the highly erosion resistant coatings described in U.S. Patent Publication No. US 2011/0217568 can be used.

Example of Application

A gas turbine generating electricity and having a "firing temperature" of 1363 K burns, at full load and in continuous mode, 30 tons per hour of heavy fuel containing 50 ppm vanadium.

First Operating Cycle: Operation with Conventional Inhibition

The conventional inhibition method, which is initially applied, involves the injection of 150 ppm magnesium into the heavy fuel, e.g. in the form of a liposoluble additive containing 20% by weight of magnesium.

After 100 hours of operation, the gas turbine, whose initial power output was 105 megawatts of electrical output (MWe) and which undergoes a progressive, substantially linear, decrease of power, generates only 100.5 MWe. The 4.5 MWe loss corresponds to a 4.4% reduction in the initial power output. An on-line dry cleaning operation according to the conventional method, using nut shell fragments, is performed. However, only a 0.2 MWe power gain is obtained, which is a power recovery rate of only 4.8% of the "lost" power.

After 180 hours of operation at full load with heavy fuel, the gas turbine's initial power output of 105 MWe has fallen to 96.5 MWe which corresponds to an absolute loss of 8.5 MWe, at a power decline rate of 0.047 MWe per hour of operation and a relative loss of 8% of the initial power output, which value is used as threshold for the application of a turbine wash. This wash is therefore carried out after 180 hours of operation (or approximately every 7.5 days).

Second Operating Cycle: Operation with Bimetallic Inhibition

Without changing the fuel or modifying the load of the gas turbine, the conventional inhibition method is replaced by a bimetallic method using iron as the second oxide, based on the following equation:

$$V_2O_5 + 9\ MgO + 4.5\ Fe_2O_3 \rightarrow Mg_3V_2O_8 + 4.5\ MgFe_2O_4 + 1.5\ MgO.$$

This corresponds to the case of inhibition in the presence of double oxide $MgFe_2O_4$ ("A"=Fe) with the parameters m=9 and a=4.5.

The firing temperature is brought to 1378 K which provides an increase in power of 1.5 MWe and brings the initial power output to 106.5 MWe, on a clean machine.

At time t=150 hours, the gas turbine has a power output of 103.8 MWe which corresponds to a loss of power of 2.7 MWe (i.e. 106.5−103.8=2.7 MWe).

At this time a cleaning operation using nut shell fragments is performed. The power recovery obtained is approximately 0.15 MWe or a power recovery rate of only 5.5% of the "lost" power.

The operating time between two washes goes from 180 to approximately 450 hours, with a loss of power of 7.8% (final power output of 98.2 MWe). The power decline rate is therefore 0.018 MWe per hour of operation.

Thus, the use of the bimetallic inhibition method slows down the fouling of the gas turbine, even though in the particular case under consideration, the firing temperature has been increased which was predicted to enhance the fouling effect. After 450 hours of operation in this second operating cycle, the gas turbine is stopped, allowed to cool down and then washed with water.

Third Operating Cycle: Operation with Conventional Inhibition, with Application of a Dry Cleaning Operation Using an Inorganic Descaling Agent The gas turbine is subsequently restarted and again operated at full load with the same HFO, but also with the conventional inhibition method. Additionally, the gas turbine is operated with a firing temperature of 1363 K and an initial power output of 105 MWe. Therefore, 150 ppm magnesium is injected as in the first cycle.

After 90 hours of operation at full load with the heavy fuel, the gas turbine has a power output of 100.9 MWe, which corresponds to an absolute power loss of 4.1 MWe and 0.046 MWe per hour, which would entail, as in the preceding paragraph, a turbine wash after approximately 184 hours if it is desired not to exceed a power loss of 8%.

An on-line dry cleaning operation using wollastonite ($CaSiO_3$) suspended in water is performed. For this, a wollastonite-based cleaning agent is formulated with a density 3.1 g/dm³, a hardness 5 and an "efficiency factor" "K" of 15.5. To this end, the ore marketed under the name NYCOR® R by NYCO USA is used, for which the grain size extends to 700-800 µm and is ground so that only particles smaller than 297 µm are recovered.

The following mixture of cleaning agent is then prepared (percentage by weight): 30% of NYCOR R® gross, 8% of "polyglycol 200" (PEG 200), 6% of non-ionic dispersing additive marketed under the name Dispersogen FA® by Clariant, 4% of amine cationic dispersing additive marketed under the name Genamin CC 100® by Clariant, 0.3% of acetic acid (rheo-fluidizing additive), 0.3% of organic antifoam additive marketed under the name Efka® 2526 by BASF®, 0.2% of Myacid biocide additive marketed under the name S2® by BASF®, and for the balance, demineralized water (51.2%).

At time t=90 hours of operation in the third operating cycle, the gas turbine has a power output of 100.9 MW. The prepared cleaning agent is used to perform a first on-line dry cleaning operation on the gas turbine. For this, a volume of 120 liters of cleaning agent is injected into the gas turbine over a period of 7 minutes 30 seconds which, because of the density of the suspension (1.35 g/dm$^3$), represents approximately 25 kg of wollastonite. This injection is carried out under a pressure of approximately 30.5 bar, with a substantially constant total flow equal to 15 l/min. The injection is uniformly distributed over the ten combustion chambers of the gas turbine, so that the descaling material reaches the greatest possible fraction of the surface of the hot parts.

After this first dry cleaning operation with wollastonite, at time t=90 hours and approximately 7.5 minutes, the gas turbine has a power output of 104.4 MWe. At this point 3.5 MWe (104.4−100.9=3.5 MWe) have been recovered, which corresponds to a recovery rate of 3.5/4.1=85% of the power which was lost due to the accumulation of ash on the hot parts of the turbine.

At time t=150 hours, that is, 60 hours after the first dry cleaning operation with wollastonite, the gas turbine has a power output of 101.6 MW or a new power loss of 2.8 MWe. (104.4−101.6=2.8 MWe). A second dry cleaning operation is performed with wollastonite in conditions similar to the first cleaning operation. After this second cleaning, a power output of 102.1 MWe is recorded, or a power recovery of 102.1−101.6=2.3 MWe, i.e. a recovery rate of 2.3/2.8=82% is obtained for this second dry cleaning operation.

At least one conclusion emerging from these two dry cleaning operations with wollastonite, with recovery rates of 85% and 82%, is that the inorganic descaling agent cleaning method is much more efficient than the method using ligneous materials.

After 200 cumulative hours of operation, the power output of the gas turbine again falls to 96.6 MWe, which is a loss of 8% with respect to the initial power output and the gas turbine is again stopped, allowed to cool down and then washed with water.

Fourth Operating Cycle: Operation with Bimetallic Inhibition and with Dry Cleaning Using an Inorganic Descaling Agent The gas turbine is restarted and again operated at full load with the same HFO but this time combining: (i) the bimetallic magnesium/aluminum inhibition method used in the second operating cycle with (ii) the inorganic descaling agent cleaning method with wollastonite used in the third operating cycle. The firing temperature is brought to 1105° C. as in the second operating cycle, which again provides an increase in power of 1.5 MWe and brings the initial power output to 106.5 MWe, on a clean machine.

After 200 hours of operation at full load with this heavy fuel, the gas turbine has a power output of 102.8 MWe. This corresponds to an absolute power loss of 3.7 MWe, a relative loss of 3.5% with respect to the initial power output, and a power decline rate of 0.0185 MWe per hour. This would entail a wash of the turbine to be carried out exactly after about 435 hours if it is desired not to exceed a power loss of 8%.

At time t=200 hours, a first on-line dry cleaning with wollastonite (CaSiO$_3$) suspended in water is performed. For this, the cleaning agent is formulated and the agent is subsequently injected in the same way as in the third operating cycle.

At the end of this first cleaning with wollastonite (time t=200 hours+8 min, approximately), the power output of the gas turbine has again increased to 106 MWe. This treatment therefore allows 3.2 MWe to be recovered, which corresponds to a recovery rate of 325/3.7=91% of the power which was "lost" due to the accumulation of ash on the hot parts of the turbine.

At time t=400 hours, the power output of the gas turbine has again fallen to 100.5 MWe or a loss of 5.5 MWe (i.e. 106−100.5=5.5 MWe) with respect to the power present at the end of the first cleaning. Therefore, a second cleaning operation identical to the first is carried out, at the end of which the power recovery is 5.1 MW, corresponding to a recovery rate of 5.1/5.5=93%.

In this fourth operating cycle where the bimetallic inhibition method and the inorganic descaling agent cleaning method are combined, the power recovery rates of 91% and 93% recorded during the first and second cleaning operations with wollastonite, as described above, are substantially better than the rates observed during the third operating cycle where dry cleaning operations using an inorganic descaling agent were applied with a recovery rate of only 82% to 85%, but during which the conventional inhibition method was used.

Although specific combinations and methods are described herein, additional combinations of, for example, the bimetallic magnesium/aluminum inhibition method and inorganic descaling agent cleaning method for operating a gas turbine within the scope of the present disclosure. Further, combinations of the bimetallic inhibitor and the inorganic descaling agents are also contemplated as additional methods for operating a gas turbine within the scope of the present disclosure. Exemplary methods of operating a gas turbine engine burning a vanadium-contaminated fuel are described above in detail. The methods provide, at least, assistance in optimizing the energy and lifetime of the gas turbine engine.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating of a gas turbine engine to inhibit vanadic corrosion of the gas turbine engine, the gas turbine engine burning a vanadium-contaminated fuel and including a component configured to be in contact with combustion gases, the method comprising:

introducing into a combustion system of the gas turbine engine a first oxide and at least one second oxide, the first oxide comprising magnesium oxide and the at least one second oxide including at least one of aluminum oxide, iron (III) oxide, titanium dioxide, and silicon dioxide; and cleaning at least a portion of the component using a cleaning agent containing a liquid vector and at least one descaling material that is suspended in the liquid vector, wherein the at least one descaling material is an inorganic material, wherein a ratio, "m", of the number of moles of MgO to the number of moles of V$_2$O$_5$ and a ratio, "a", of the total number of moles of the at least one second oxide to the number of moles of $V_2O_5$ satisfies the following conditions:

$$a+3<m<15; \text{ and}$$

$$[1/(1+K)](m-2) \leq a \leq [10/(10+K)](m-2)$$

wherein K is defined by the relation: $K=MV^* HK^* e^{(-0,0056^*T)}$, in which T is the firing temperature of the gas turbine in Kelvin, and MV and HK designate, respectively, an average density and an average Knoop hardness of a plurality of double oxides formed by a reaction between the first oxide and the at least one second oxide.

2. The method according to claim 1, wherein the ratios "m" and "a" further satisfy the relation:

$$m \geq a+3.5.$$

3. The method according to claim 1, wherein the ratios "m" and "a" further satisfy the relation:

$$[2/(2+K)](m-2) \leq a \leq [5/(5+K)](m-2).$$

4. The method according to claim 1, wherein "m" is approximately 9 and "a" is approximately 4.5.

5. The method according to claim 1, wherein the at least one descaling material is derived from at least one oxide of at least one of the following elements: magnesium, calcium, titanium, iron, aluminum, silicon, and phosphorus in the form of alkaline-earth phosphates.

6. The method according to claim 5, wherein the at least one oxide is one of anhydrous and hydrated.

7. The method according to claim 5, wherein the at least one descaling material is at least partially derived from a non-fibrous structure silicate.

8. The method according to claim 5, wherein the at least one descaling material is at least partially derived from alkaline-earth phosphates.

9. The method according to claim 1, wherein the descaling material has a Mohs hardness less than or equal to 7 and a product of the descaling material density and the Mohs hardness is between about 12 and 35.

10. The method according to claim 9, wherein the descaling material comprises a plurality of particles, an average size of the plurality of particles of the descaling material is between about 5 and 315 micrometers.

11. The method according to claim 9, wherein the Mohs hardness of the descaling material is about 5.

12. The method according to claim 1, wherein the firing temperature of the gas turbine engine is greater than or equal to 1363 Kelvin.

13. The method according to claim 1, further comprising repeating the cleaning of the at least the portion of the component using the cleaning agent during an operating cycle of the gas turbine.

14. The method of claim 1, wherein the component is coated with an erosion-resistant coating comprising at least one of chromium carbide, alumina, and titanium oxide.

15. The method according to claim 1, wherein the at least one descaling material comprises at least one of hematite, maghemite, goethite, lepidocrocite, magnetite, wustite, rutile, anatase, brookite, geikielite, perovskite, ilmenite, wollastonite, larnite, enstatite, akermanite, diopside, merwinite, monticellite, fosterite, fayalite, andradite, andalousite, cyanite, sillimanite, mullite, anorthite, ghelenite, hydroxyapatite.

16. The method according to claim 1, wherein the liquid vector is hydrophilic.

17. The method according to claim 16, wherein the liquid vector comprises at least one of an alcohol, a polyol, a polyethylene glycol, or a polyether.

18. The method according to claim 1, wherein the liquid vector comprises at least one non-anionic dispersing additive.

19. The method according to claim 1, wherein the liquid vector comprises at least one antifoam additive.

* * * * *

UNITED STATES PATENT AND TRADEMARK OFFICE
CERTIFICATE OF CORRECTION

PATENT NO. : 9,976,488 B2  
APPLICATION NO. : 14/691053  
DATED : May 22, 2018  
INVENTOR(S) : Dmitry Sokolov et al.

Page 1 of 1

It is certified that error appears in the above-identified patent and that said Letters Patent is hereby corrected as shown below:

In the Specification

Column 6, Line 10, delete "origin OW represents" and insert therefor -- origin $O_1I_1$ represents --.

Column 6, Line 57, delete "at OW of" and insert therefor -- at $O_1I_1$ of --.

Signed and Sealed this
Nineteenth Day of February, 2019

Andrei Iancu
*Director of the United States Patent and Trademark Office*